United States Patent
Salameh

(10) Patent No.: US 9,926,882 B2
(45) Date of Patent: Mar. 27, 2018

(54) CARRIER FRAME SEAL WITH IMPROVED SEALING EFFECT

(71) Applicant: Federal-Mogul Sealing Systems GmbH, Herdorf (DE)

(72) Inventor: Ralf Salameh, Gondelsheim (DE)

(73) Assignee: Federal-Mogul Sealing Systems GmbH, Herdorf (DE)

(*) Notice: Subject to any disclaimer, the term of this patent is extended or adjusted under 35 U.S.C. 154(b) by 121 days.

(21) Appl. No.: 14/396,864

(22) PCT Filed: Nov. 28, 2012

(86) PCT No.: PCT/EP2012/073769
§ 371 (c)(1),
(2) Date: Oct. 24, 2014

(87) PCT Pub. No.: WO2013/159839
PCT Pub. Date: Oct. 31, 2013

(65) Prior Publication Data
US 2015/0137459 A1    May 21, 2015

(30) Foreign Application Priority Data
Apr. 25, 2012   (DE) .................. 10 2012 206 775

(51) Int. Cl.
*F02F 11/00* (2006.01)
*F16J 15/08* (2006.01)
*F16J 15/12* (2006.01)

(52) U.S. Cl.
CPC ............ *F02F 11/00* (2013.01); *F02F 11/002* (2013.01); *F16J 15/0818* (2013.01); *F16J 15/122* (2013.01); *F16J 2015/0856* (2013.01)

(58) Field of Classification Search
CPC ................. F16J 15/0818; F16J 15/0825; F16J 2015/0856; F16J 2015/0868; F02F 11/002
See application file for complete search history.

(56) References Cited

U.S. PATENT DOCUMENTS

| 5,033,189 | A | * | 7/1991 | Desverchere | F16J 15/122 277/594 |
| 5,267,740 | A | * | 12/1993 | Stritzke | F16J 15/0818 277/316 |
| 6,371,489 | B1 | * | 4/2002 | Combet | F16J 15/0825 277/594 |
| 6,390,479 | B1 | * | 5/2002 | Combet | F16J 15/0818 264/273 |
| 2005/0023768 | A1 | | 2/2005 | Adams et al. | |

(Continued)

FOREIGN PATENT DOCUMENTS

| DE | 10155806 A1 | * | 7/2003 | ............. F16J 15/122 |
| DE | 102008039540 | * | 3/2010 | ............. F16J 15/061 |
| WO | WO-2015010863 | * | 1/2015 | |

OTHER PUBLICATIONS

DE102008039540 Machine Translation.*

*Primary Examiner* — Nicholas L Foster
(74) *Attorney, Agent, or Firm* — Robert L. Stearns; Dickinson Wright, PLLC

(57) ABSTRACT

A carrier frame seal for use in engine and cylinder components of internal combustion engines having improved sealing effect in the region of the connecting webs between different regions of the carrier frame.

10 Claims, 4 Drawing Sheets

(56) References Cited

U.S. PATENT DOCUMENTS

2005/0134008 A1* 6/2005 Salameh ................ F16J 15/062
  277/628
2005/0285353 A1* 12/2005 Rueger ................ F16J 15/123
  277/596

* cited by examiner

Fig. 1 (State of the art)
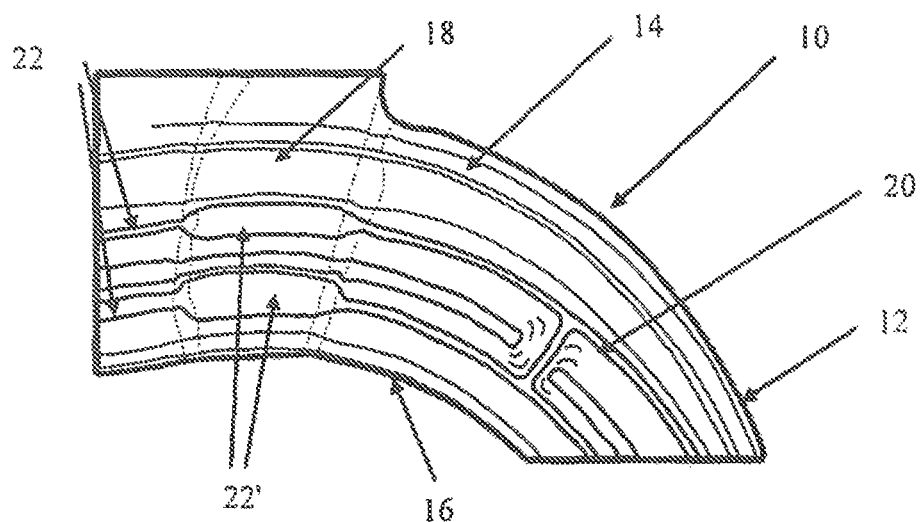
Fig. 2 (State of the art)
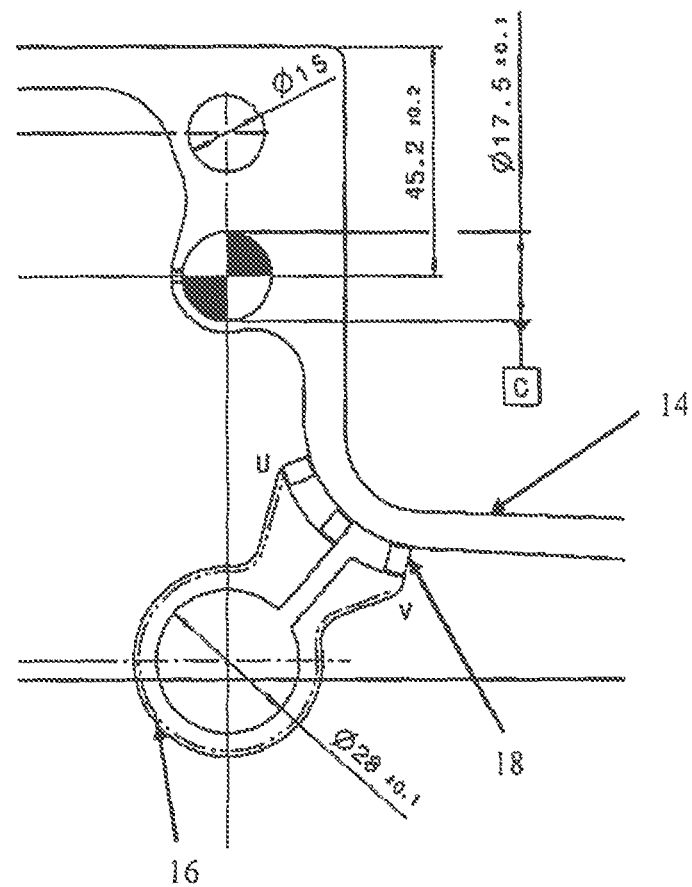

Fig. 3 (State of the art)
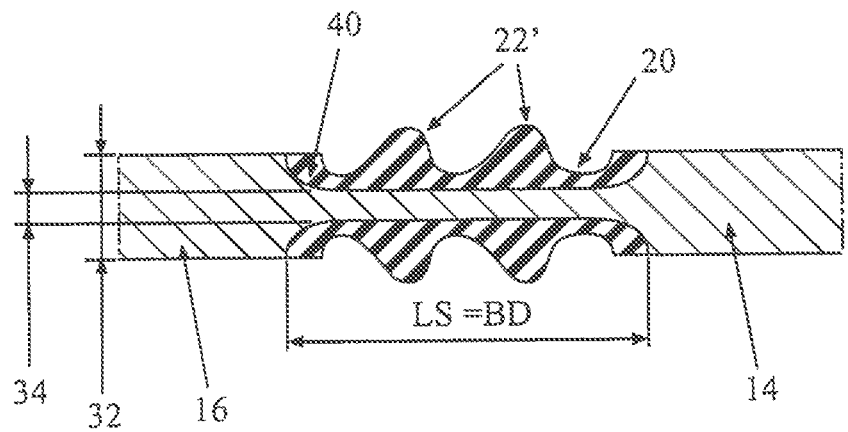
Fig. 4
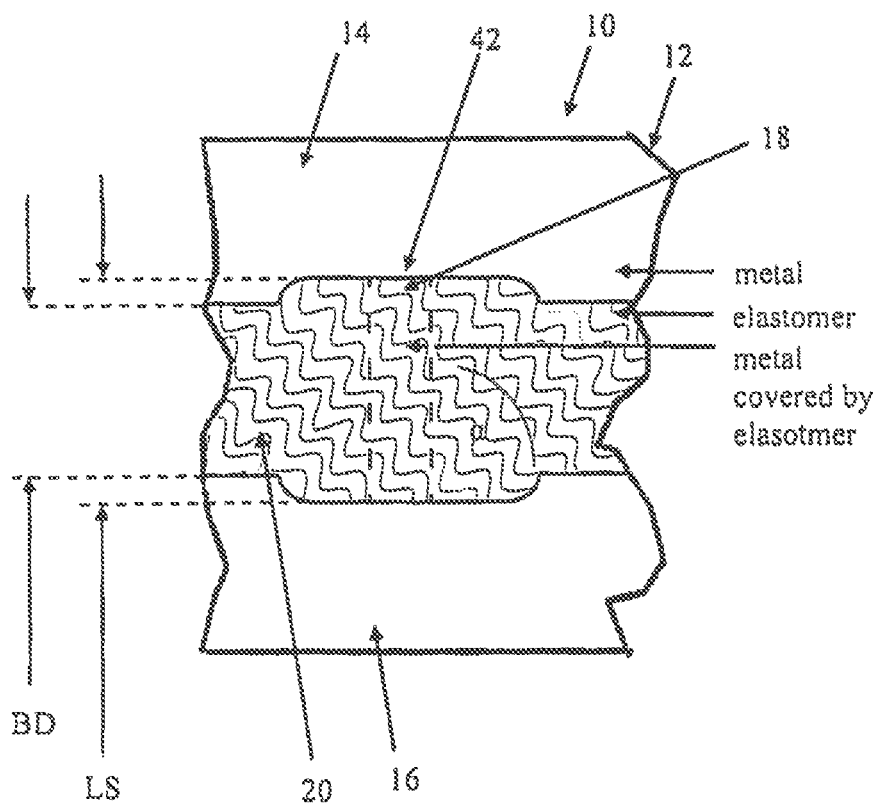

CARRIER FRAME SEAL WITH IMPROVED SEALING EFFECT

BACKGROUND OF THE INVENTION

1. Technical Field

The present invention relates to a carrier frame seal for use in engine and cylinder components of internal combustion engines, for example on the valve cover or on the oil pan. In particular, the present invention relates to a carrier frame seal with improved sealing effect in the region of the connecting webs between different regions of the carrier frame.

2. Related Art

Carrier frame seals are frequently used as seals for internal combustion engines. Carrier frame seals have the advantage that sealing profiles of elastomer material can be vulcanised onto a carrier frame and the seal thereby becomes readily able to be handled. Furthermore, different solutions can be realized for function separation. Thus, the tightness can be achieved by the sealing profile and partition webs lying between the sealing lips. Bolt forces, on the other hand, are transferred by a carrier plate or by integrated spacers. Such carrier frames are frequently manufactured predominantly from aluminium or steel carrier plates onto which an elastomer profile is vulcanised on the front side. It is advantageous in these seals that different sealing regions on a carrier plate can be combined and subsequently mounted in one piece in a cohesive manner with the carrier plate.

Particular seal arrangements make is necessary that the course of the seal, also in small regions, runs between two plate parts. The two plate regions, separated by the sealing profile, must generally be held together by connecting webs for reasons of stability. The established method for the production of such carrier frames is punching. The connecting webs are pre-punched in the normal punching process, in which the frame is punched, i.e. they are punched free on both sides of the web. The web is then stamped to its nominal thickness. In contrast to the remaining seal regions, in which the seal is vulcanised on purely on the front side, the seal runs on some regions over a stamped off metal web. Owing to cold work hardening and increasing embrittlement of the material which accompanies this, the webs can only be stamped to a particular extent. Such flat seals can be seen for example from U.S. Pat. No. 6,371,489.

A problem exists in that in particular in the case of thin carrier plates the remaining "channel" over the web does not achieve the necessary depth during stamping, due to reasons of punching technology (cold work hardening and embrittlement of the material), in order to ensure a best possible sealing effect. This leads to the elastomeric sealing profile, which runs directly over the web and is vulcanised on there and also onto the remaining regions, only being able to deform insufficiently. Thereby, the material stress is higher than in the remaining regions. This arises especially in used seals which are examined after a lengthy operating time. The sealing regions running over webs are deformed distinctly more intensively. Moreover, the compression sets of the elastomer material are substantially higher and therefore also the sealing effect under running conditions is distinctly less than in the regions in which the elastomer seal is not arranged at connecting webs.

SUMMARY OF THE INVENTION

An object of the above invention therefore consists in providing a carrier frame seal with improved sealing effect. A further object consists in the provision of a carrier frame seal wherein an improved sealing effect in the case of a lengthy operating time is achieved in the regions at which the sealing profile is present, formed onto a connecting web constructed between two regions of the carrier frame.

According to the invention, a carrier frame seal is provided, which comprises a carrier frame with different carrier frame regions, a connecting web, arranged between two carrier frame regions, which is of less thickness than the respective adjoining carrier frame regions, and a sealing profile, which runs between the two carrier frame regions.

According to the invention, the length LS of the web is greater than the width BD of the sealing profile. Thereby, it is ensured that the sealing profile lying against the web does not lie against boundaries and therefore is not subjected to an increased wear at this boundary after a lengthy operating time.

In the case, for example, of a carrier frame seal with a metallic carrier frame, the webs of which are formed by means of stamping between the carrier frame regions, the carrier frame regions form a channel for the course of the sealing profile. According to the invention, the stamped web region is wider than the actual "sealing channel" necessary for the seal. It is advantageous that the stamping edge does not necessarily have to take place at an exact location, because the sealing profile does not run on this stamping edge. In addition, the layer thickness of the web can decrease to a minimum web thickness, so that edges are basically avoided. The minimum thickness is then reliably achieved in the region of the sealing channel over which the sealing profile runs. A further advantage is that the radii necessary in the link regions can be larger and do not affect the actual channel in size. A decreasing thickness of the webs to the minimum web thickness is beneficial in addition for an increased stability and lifespan of the carrier frame seal according to the invention, because otherwise small relative movements or oscillations can cause fatigue failures on the web edge.

BRIEF DESCRIPTION OF THE DRAWINGS

In the figures there are shown:

FIG. 1 a carrier frame seal according to the prior art after lengthy operating time;

FIG. 2 a diagrammatic illustration of a carrier frame seal according to the prior art;

FIG. 3 the cross-sectional view of a conventional carrier frame seal;

FIG. 4 the top view onto a carrier frame seal according to a preferred embodiment of the present invention;

DETAILED DESCRIPTION

Figure 5:
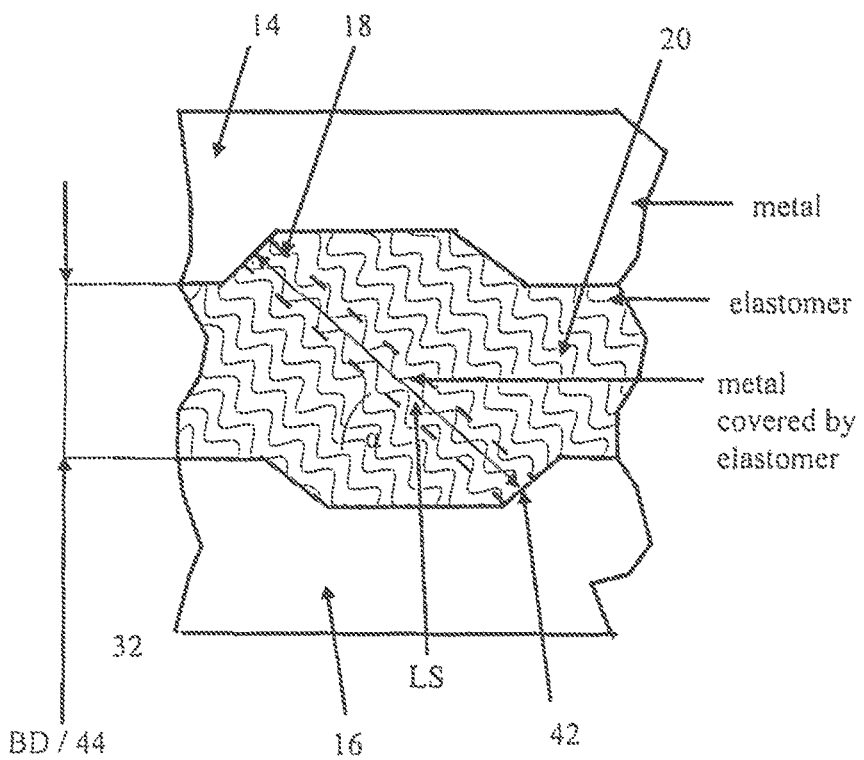
FIG. 5 the top view onto a carrier frame seal according to a further embodiment of the present invention.

According to a preferred embodiment of the present invention, a carrier frame seal is provided. The carrier frame seal comprises a carrier frame with at least a first and a second carrier frame region; a web, which connects the first carrier frame region and second carrier frame region and which has a smaller thickness than the adjoining carrier frame regions; and a sealing profile running between the first carrier frame region and second carrier frame region. A length LS of the web is greater than a width BD of the sealing profile.

A carrier frame seal is usually used in internal combustion engines, in particular in cylinder components. For this, carrier frame seals usually consist of a carrier frame with an injected sealing system. The carrier frame can be produced for example from steel or aluminium, but various composite materials can also come into use. Connecting webs between individual regions of the carrier frame can be obtained by lateral free punching and subsequent stamping. Corresponding methods for the production of carrier frames are familiar to the specialist in the art.

The sealing profile is usually an elastomer sealing profile, which can be applied for example by vulcanising directly onto one or both sides of the carrier frame. Thus, sealing profiles can for example completely surround webs between different regions of the carrier frame. Sealing profiles can assume various shapes. Usually, the sealing profile has flat sealing regions and/or sealing regions with one or more sealing lips. Several partition webs, arranged between the sealing lips, can be present for stabilisation purposes, wherein the partition webs, in addition to the task of stabilising the sealing lips, also have the task of delimiting different sealing regions (sealing chambers) from one another. Thus, several closed regions are produced by the transverse partitions, which are intended to prevent for example medium, which enters through a damaged site at the first sealing lip, from circulating between the two sealing lips and then perhaps being able to emerge at a different "far" remote site with damage to the second sealing lip.

Suitable elastomer materials include for example silicone, but also organic materials, such as for example fluororubber, acrylate rubber, polyacrylate acrylic resin, polyacrylate, ethylene acrylate, ethylene propylene and/or hydrogenated nitrile. The sealing profile can consist, in certain areas, of various organic elastomer materials. Such seals can be produced at a favourable price. Such a seal is preferably not rigid, whereby mounting is made difficult and the seal can be damaged during mounting. The sealing profile can be constructed for example by means of an injection method with which the specialist in the art is familiar and can be applied to connecting webs. Thus, a carrier frame can be provided which is fed continuously to an injection device, which in an injection process applies onto the carrier cyclically on one side or on both sides an organic elastomer material as a seal. Subsequently, the seal is punched free.

According to the invention, through the fact that the length LS of the web is greater than a width BD of the sealing profile, it is ensured that the web does not abut at any edge with for example one of the thicker adjoining carrier frame regions, whereby an increased wear of the carrier frame seal is entailed. According to the invention, the web can have a constant thickness over its entire length. Preferably, the web has a continuously decreasing thickness from the exterior towards the bearing area of the sealing profile, wherein at the actual bearing area of the sealing profile the layer thickness of the web assumes a minimum value and is preferably constant. The cross-section of the web, viewed in longitudinal direction, can be rectangular. Preferably, the edges are rounded. Preferably, the cross-section of the web has a substantially elliptical shape. The web has, in addition, a particular ratio of the length to the width. The ratio of the web length to the web width can be for example 2:1 to 10:1 and preferably 3:1 to 9:1. Preferred ratios of the web length to the web width here are 4:1, 5:1, 6:1 or 7:1.

The present invention improves the sealing capability. The elastomer material of the seal can namely be more highly stressed owing to a web lying therebeneath, and the "compression set" can be greater, i.e. after dismantling, the seal no longer comes as high as in other regions. This means that the sealing capability is also impaired in conventional seals.

According to a further embodiment, a longitudinal direction of the sealing profile intersects a longitudinal direction of the web at an angle α of substantially 90°. The web here produces the shortest possible connection between the first and second carrier frame region. An angle of substantially 90° comprises here angles of 60° to 90°, preferably 70° to 90°, 80° to 90°, 85° to 90°, 86° to 90°, 87° to 90°, 88° to 90° and 89° to 90°.

According to a preferred embodiment, a longitudinal direction of the sealing profile intersects a longitudinal direction of the web at an angle α of substantially 45° or less. The angle α here is preferably 5° to 45°, 10° to 45°, 15° to 35°, and 20° to 35°. Most preferred are angles α of 21°, 22°, 23°, 24°, 25°, 26°, 27°, 28°, 29°, 30°, 31°, 32°, 33° and 34°.

According to a further preferred embodiment, the sealing profile has at least a first and a second sealing lip, wherein the first sealing lip is present in a first region over the web, and the second sealing lip is present in a second region over the web. It is clear that the spatial term "over" results only from the point of view of the carrier frame seal. The respective arrangement of the sealing lips over (and/or under) a web defines the different regions. With an angle α of 90° for example, the regions are arranged at the same position with respect to the longitudinal direction of the sealing profile. It will become clear that with a small angle α, for example 20°, and with, at the same time, a large ratio of the web length to the web width, for example 8:1, the regions are arranged at different positions with respect to that of the longitudinal direction of the sealing profile. Furthermore, more sealing lips can be present. For example, 5, 4 or 3 sealing lips can be present, from which a corresponding number of regions results.

According to a preferred embodiment of the present invention, the first region and the second region lie on different sides of an orthogonal to the longitudinal direction of the sealing profile. On different sides of the orthogonal means here that the regions do not touch the orthogonal. It is thereby ensured that always only one sealing lip, viewed in section, runs over the web. This results in the most minimal impairment by the necessary connecting web because, viewed over the entire course of the seal, a sealing lip can always fulfill its function in an optimum manner, and is not impaired by a web. It is clear that in this configuration of the carrier frame seal, the length LS of the web does not necessarily have to be greater than a width BD of the sealing profile. The length LS of the web can also correspond to the width BD of the sealing profile.

According to a preferred embodiment of the present invention, a carrier frame seal is provided, in which a first partition web is present, constructed along the orthogonal, and connects the at least first and second sealing lip. Thereby, an optimum separation is achieved of the at least one first region and a second region, so that in the case of a fracture of a sealing lip in a region of high stress, in which the sealing lip runs over a web, an effective delimitation is achieved from the nearest region of high stress. Through the arrangement of the partition web orthogonally to the sealing lip, furthermore a least possible stress is achieved in the case of damage to a sealing lip. Alternatively, one or more partition webs can be arranged obliquely to the sealing lip.

According to a further embodiment of the present invention, the above-mentioned isolation of a region of high stress can be still further improved when the first region and the second region are encompassed by second partition webs. Ideally, the partition webs run directly adjoining the first or respectively second region, but they can also be present spaced apart therefrom.

According to a further embodiment, the sealing profile runs above and below the web. Preferably, the sealing profile surrounds/encloses the web.

According to an embodiment, the carrier frame is produced from steel or aluminium, whereby a simple manufacture of the web, for example by means of stamping, can be achieved and edges arising here for example do not lead to an increased wear of the sealing profile resting on the web or surrounding the latter.

According to a further embodiment, the first carrier frame region and the second carrier frame region are connected by further webs. It is clear that these webs can be different from one another, so that any desired number of webs can be combined with a different angle α and a different ratio of the length to the width.

The following figures serve to explain embodiments of the invention by way of example, without limiting it thereto.

FIG. 1 shows a carrier frame seal 10 according to the prior art after a lengthy operating time. The carrier frame 12 of the carrier frame seal 10 comprises a first carrier frame region 14 and a second carrier frame region 16. A web 18 connects the first and second carrier frame region 14, 16. The sealing profile 20 with two sealing lips 22, 22' runs in the sealing channel which is arranged between the two carrier frame regions 14, 16. It can be clearly seen that the sealing lips are subjected to less wear in a web-free region 22 than the sealing lips 22' running over the web 18. The sealing lips are thus substantially more intensively deformed in the region 22' than in the region 22. It can be seen from the diagrammatic illustration of a conventional carrier frame seal, shown in FIG. 2, that the webs 18 running under the sealing profile (not shown) represent the shortest connection between first [and] second carrier frame region 14, 16, in which an angle α (not shown) is approximately 90°. It can be seen from the cross-sectional view of a conventional carrier frame seal in the web region, shown in FIG. 3, that the web 18 running between the carrier frame region 14, 16, has the same length LS and width BD. The sealing profile 20 is, in addition, fitted into the depression, which is caused by the smaller thickness 34 of the web 18 in comparison with the thickness 32 of the two carrier frame regions 14, 16, and runs on both sides of the web 18. The depression has, in addition, radii 40, in order to reduce the notch effect.

In the carrier frame seal 10 of FIG. 4, the web 18 connects the first carrier frame region 14 and the second carrier frame region 20. The sealing profile 20 runs over the web 18. The length LS of the web 18 is greater than the width BD of the sealing profile 20, whereby an increased design freedom is achieved with regard to the guidance of the sealing profile 20. In addition, the edge region 42, at which the web 18 passes over into the two carrier frame regions 14, 16, is present spaced apart from the sealing profile 20, so that a mechanical stressing of the sealing profile on the edge region 42 can be avoided. In this embodiment, the longitudinal direction of the sealing profile intersects the longitudinal direction of the web at an angle α of 90°.

It can be seen from FIG. 5 that the web 18 connects the first carrier frame region 14 and the second carrier frame region 20 at an angle α of approximately 45°. 44 indicates the maximum possible width of the sealing profile 20. In this embodiment, the edge region 42 is also present spaced apart from the sealing profile 20.

Figure 6:
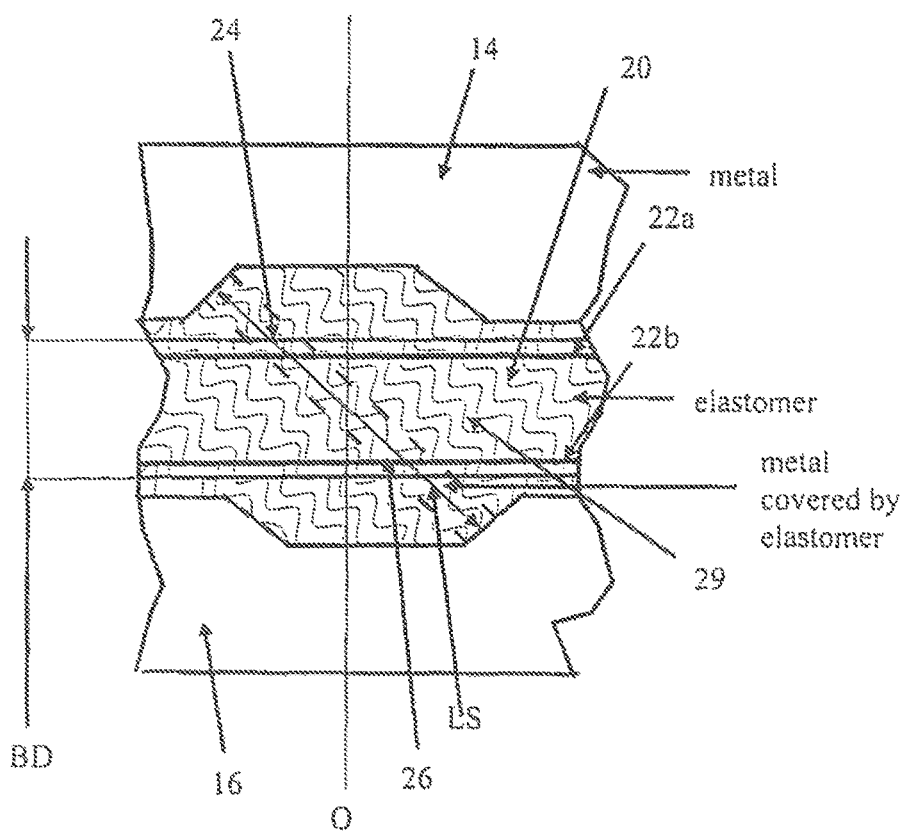
FIG. 6 the top view onto a carrier frame seal according to an embodiment of the present invention.

FIG. 6 shows the carrier frame seal 10 of FIG. 5. The sealing profile 20 has a first sealing lip 22a and a second sealing lip 22b. The first sealing lip 22a is present in a first region 24 over the web 18, the second sealing lip 22b is present in a second region 26 over the web 18. The first region 24 and the second region 26 lie on different sides of an orthogonal O to the longitudinal direction of the sealing profile. It is thereby ensured that both sealing lips 22a, 22b do not run simultaneously over the web 18 and with the use of the carrier frame seal 10 can not be impaired at identical sites/regions with respect to the orthogonal O.

Figure 7:
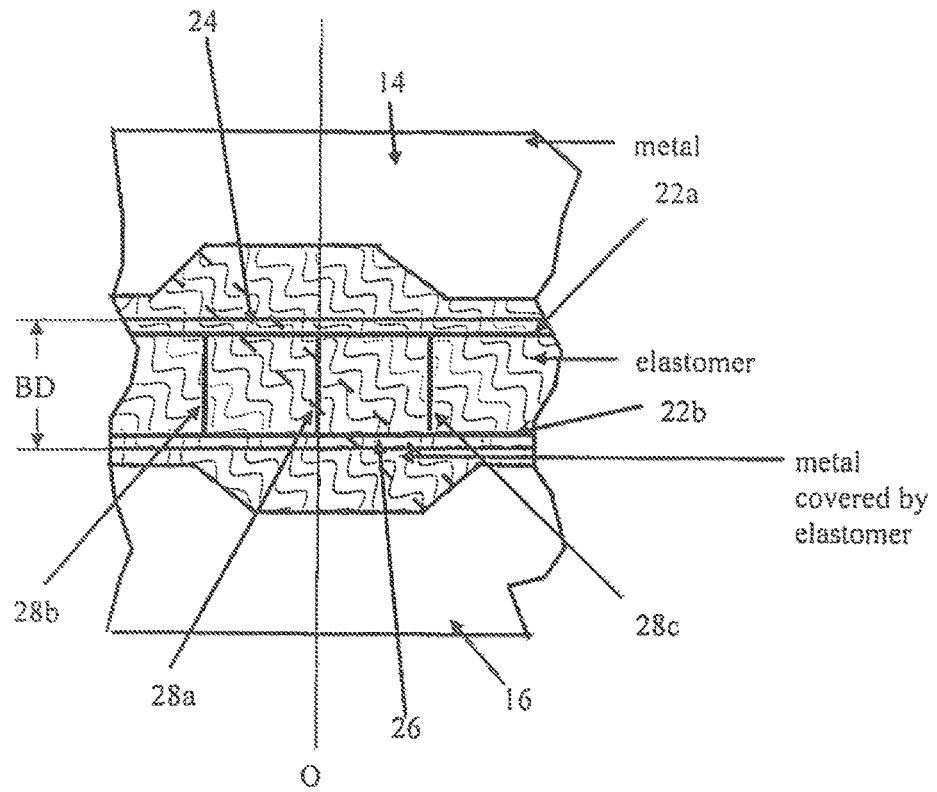
FIG. 7 the top view onto a carrier frame seal according to a further embodiment of the present invention.

FIG. 7 shows a carrier frame seal 10 of FIG. 6, wherein first sealing lip 22a is connected with the second sealing lip 22b by partition webs 28a, 28b, 28c. The partition webs 28a, 28b, 28c run orthogonally to the longitudinal direction of the sealing profile 20. A first partition web 28a is constructed along the orthogonal O and connects the first with the second sealing lip 22a, 22b. It is therefore ensured that the regions 24, 26, which undergo an increased stress with the use of the carrier frame seal 10, are separated from one another 7. The first region 24 and the second region 26 are encompassed by second partition webs 28b, 28c such that the regions 24, 26 are present separated from regions of lower stress, i.e. from regions of the sealing profile spaced apart from the web 18.

Figure 8:
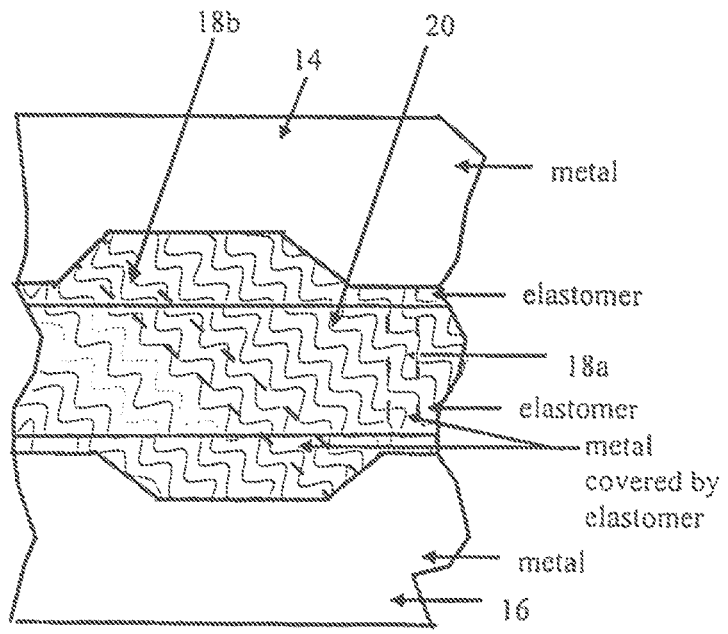
FIG. 8 the top view onto a carrier frame seal according to a preferred embodiment of the present invention.

From FIG. 8 a carrier frame seal 10 can be seen, in which the two carrier frame regions 14, 16 are separated by two webs 18a, 18b.

The invention claimed is:

1. A planar carrier frame seal for use in engine and cylinder components of internal combustion engines, comprising:
   a carrier frame with at least a first and a second carrier frame region defining a space there between;
   a web extending diagonally across the space in a longitudinal direction of the web and connecting the first carrier frame region and the second carrier frame region in respective edge regions; and
   a sealing profile extending longitudinally along the space in a longitudinal direction of the sealing profile and bridging the first carrier frame region and the second carrier frame region and extending laterally across the web to define an overlap region of the sealing profile and the web,
   wherein within the overlap region of the sealing profile and the web, the longitudinal direction of the sealing profile intersects the longitudinal direction of the web at an angle α of 45° or less, as projected in a direction orthogonal to a plane of extension of the carrier frame seal, and
   wherein edges of the first carrier frame region and the second carrier frame region in the respective edge regions are spaced further apart as compared to the space in areas outside the edge regions.

2. The carrier frame seal according to claim 1, wherein the sealing profile has at least a first and a second sealing lip extending along the longitudinal direction of the sealing profile, and wherein the first sealing lip is present in a first region over the web, and the second sealing lip is present in a second region over the web and the first region and the second region lie on separate sides of the longitudinal direction of the sealing profile and are orthogonal to the longitudinal direction of the sealing profile.

3. The carrier frame seal according to claim 2, wherein a first partition web is constructed along a direction orthogonal to the longitudinal direction of the sealing profile and extends orthogonally away from the plane of extension of the carrier frame seal a height equal to a lip height of the first and second sealing lips and wherein the first partition web connects the at least first and second sealing lip.

4. The carrier frame seal according to claim 3, wherein the first region and the second region are encompassed by second partition webs.

5. The carrier frame seal according to claim 1, wherein the sealing profile runs above and below the web.

6. The carrier frame seal according to claim 1, wherein the carrier frame is produced from steel or aluminum.

7. The carrier frame seal according to claim 1, wherein the first carrier frame region and the second carrier frame region are connected by further webs.

8. A planar carrier frame seal for use in engine and cylinder components of internal combustion engines, comprising:
   a carrier frame with at least a first and a second carrier frame region defining a space there between;
   a web extending across the space in a longitudinal direction of the web and connecting the first carrier frame region and the second carrier frame region in respective edge regions, the web crosses the space diagonally as seen in a direction orthogonal to a plane of extension of the carrier frame seal;
   a sealing profile extending longitudinally along the space in a longitudinal direction of the sealing profile and bridging the first carrier frame region and the second carrier frame region and extending laterally across the web to define an overlap region of the sealing profile and the web and including at least a first sealing lip and a second sealing lip extending along the longitudinal direction of the sealing profile; and
   the first sealing lip crossing the web at a first stress region within the overlap region and the second sealing lip crossing the web at a second stress region within the overlap region and spaced longitudinally along the sealing profile from the first stress region, and
   wherein an edge of at least one of the first carrier frame region and the second carrier frame region defines a recess extending orthogonally to the longitudinal direction of the sealing profile in the edge regions.

9. A planar carrier frame seal for use in engine and cylinder components of internal combustion engines, comprising:
   a carrier frame of a single layer of material with at least a first and a second carrier frame region defining a space there between;
   a web of the single layer of material of the carrier frame extending across the space in a longitudinal direction of the web and connecting the first carrier frame region and the second carrier frame region in respective edge regions and wherein the web has a smaller thickness defined normally to the carrier frame and the longitudinal direction of the web than a thickness of the adjoining first and second carrier frame regions defined normally to the carrier frame and the longitudinal direction of the web, and wherein the web crosses the space diagonally as seen in a projection orthogonal to a plane of extension of the planar carrier frame seal; and
   a sealing profile extending longitudinally along the space in a longitudinal direction of the sealing profile and bridging the first carrier frame region and the second carrier frame region and extending laterally over the web to define an overlap region of the sealing profile and the web,
   wherein a length, LS, of the web in the longitudinal direction of the web between the first carrier frame region and the second carrier frame region is greater than a width, BD, of the sealing profile as measured between edges of the first carrier frame region and the second carrier frame region in the overlap region; and
   wherein the longitudinal direction of the sealing profile, extending orthogonally to the width, BD, of the sealing profile, intersects the longitudinal direction of the web at an angle $\alpha$ of 45° or less in the overlap region within an extension of the web, and
   wherein the edges of the first carrier frame region and the second carrier frame region in the respective edge regions are spaced further apart as compared to the space in areas outside the edge regions.

10. The carrier frame seal according to claim 1, wherein the web has a width defined orthogonally to the longitudinal direction of the web and the width is constant along its entire length from the first carrier frame region to the second carrier frame region.

* * * * *